(12) United States Patent
Mammoli et al.

(10) Patent No.: US 9,692,234 B2
(45) Date of Patent: Jun. 27, 2017

(54) SYSTEMS AND METHODS FOR DISTRIBUTING POWER USING PHOTOVOLTAIC RESOURCES AND A SHIFTING BATTERY SYSTEM

(71) Applicant: STC.UNM, Albuquerque, NM (US)

(72) Inventors: Andrea A. Mammoli, Corrales, NM (US); Olga Lavrova, Albuquerque, NM (US); Brian Arellano, Rio Rancho, NM (US); Feng Cheng, Albuquerque, NM (US); Wesley Greenwood, Albuquerque, NM (US); Jonathan Hawkins, Albuquerque, NM (US); Steve Willard, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/031,125

(22) PCT Filed: Oct. 21, 2014

(86) PCT No.: PCT/US2014/061637
§ 371 (c)(1),
(2) Date: Apr. 21, 2016

(87) PCT Pub. No.: WO2015/061360
PCT Pub. Date: Apr. 30, 2015

(65) Prior Publication Data
US 2016/0241042 A1    Aug. 18, 2016

Related U.S. Application Data

(60) Provisional application No. 61/893,680, filed on Oct. 21, 2013.

(51) Int. Cl.
*H02J 3/32*    (2006.01)
*H02S 40/38*    (2014.01)
(Continued)

(52) U.S. Cl.
CPC ............... *H02J 3/383* (2013.01); *H02J 3/12* (2013.01); *H02J 3/32* (2013.01); *H02J 3/386* (2013.01);
(Continued)

(58) Field of Classification Search
CPC .......... H02M 3/04; H02M 7/44; H02J 7/0068; H02J 3/386; H02J 3/383; H02J 3/32; H02S 40/38
(Continued)

(56) References Cited

U.S. PATENT DOCUMENTS

2007/0271006 A1*  11/2007  Golden ............... H02J 3/14
                                                          700/295
2007/0276547 A1*  11/2007  Miller ............... G06Q 50/06
                                                          700/295
(Continued)

FOREIGN PATENT DOCUMENTS

| JP | 2002017043 A | 1/2002 |
| JP | 2002218654 A | 8/2002 |
| KR | 1020130005362 | 1/2013 |

OTHER PUBLICATIONS

International Search Report and Written Opinion of the International Search Authority for PCT/US2014/061637, Jan. 27, 2015 (7 pages).

*Primary Examiner* — Rexford Barnie
*Assistant Examiner* — Thai Tran
(74) *Attorney, Agent, or Firm* — Nathaniel A. Gilder; Jensen & Puntigam, PS (57) ABSTRACT

The present invention is an apparatus and method for delivering energy using a renewable resource. The method includes providing a photovoltaic energy source and applying energy storage to the photovoltaic energy source via a battery storage unit. The energy output from the photovoltaic energy source and the battery system is controlled using (Continued)

a battery control system. The battery control system predicts peak load, develops a schedule that includes when to begin discharging power and when to stop discharging power, shifts power to the battery storage unit when excess power is available, and prioritizes the functionality of the battery storage unit and the photovoltaic energy source.

16 Claims, 11 Drawing Sheets

(51) Int. Cl.
    *H02J 3/38*    (2006.01)
    *H02J 3/12*    (2006.01)
    *H02J 7/00*    (2006.01)
    *H02M 3/04*   (2006.01)
    *H02M 7/44*   (2006.01)
(52) U.S. Cl.
    CPC ............. *H02J 7/0068* (2013.01); *H02M 3/04* (2013.01); *H02M 7/44* (2013.01); *H02S 40/38* (2014.12); *Y02E 10/563* (2013.01); *Y02E 10/566* (2013.01); *Y02E 70/30* (2013.01)
(58) Field of Classification Search
    USPC ................... 307/19, 29; 700/286, 291, 295
    See application file for complete search history.

(56) References Cited

U.S. PATENT DOCUMENTS

| | | | |
|---|---|---|---|
| 2010/0164428 A1* | 7/2010 | Xu | F01D 15/10 |
| | | | 318/767 |
| 2012/0025614 A1* | 2/2012 | Taimela | H02J 9/062 |
| | | | 307/65 |
| 2013/0184884 A1 | 7/2013 | More | |
| 2013/0229057 A1* | 9/2013 | Taima | H02J 3/32 |
| | | | 307/19 |

\* cited by examiner

SYSTEMS AND METHODS FOR DISTRIBUTING POWER USING PHOTOVOLTAIC RESOURCES AND A SHIFTING BATTERY SYSTEM

CROSS-REFERENCE TO RELATED APPLICATIONS

This application is a U.S. National Stage Application filing under 35 U.S.C. §371 of International Application PCT/US2014/061637, entitled "SYSTEMS AND METHODS FOR DISTRIBUTING POWER USING PHOTOVOLTAIC RESOURCES AND A SHIFTING BATTERY SYSTEM", filed on Oct. 21, 2014, which claims priority under 35 U.S.C. §119 of U.S. Provisional Patent Application 61/893,680, entitled "SYSTEMS AND METHODS FOR DISTRIBUTING POWER USING PHOTOVOLTAIC RESOURCES AND A SHIFTING BATTERY SYSTEM", filed on Oct. 21, 2013. The disclosures of the prior applications are incorporated by reference herein in their entirety.

STATEMENT REGARDING FEDERALLY SPONSORED RESEARCH OR DEVELOPMENT

This invention was made with government support under contract number DEOE0000230 awarded by the U.S. Department of Energy. The government has certain rights in the invention.

BACKGROUND

Field of the Invention

The present invention generally relates to systems and methods for distributing power and more specifically relates to systems and methods for distributing power using photovoltaic resources and battery energy storage to address intermittency needs and make renewable energy resources more reliable by using shifting.

Description of the Related Art

Renewable resources are becoming more and more available and affordable due to the development of technology and the enactment of government policies. Renewables and specifically photovoltaics (PV) are playing an ever increasing role in the resource mix for utilities across the nation. Many of these resources pose new integration challenges compared to traditional power generation. Electric utilities are required to deliver reliable power to customers and must operate utility grids within strict voltage limits. As renewable energy becomes a larger player amongst the resources supplying energy to these grids, issues begin arising due to the intermittent nature of these resources. The output from solar power can align reasonably well with daytime consumption on an electricity grid, thereby reducing the need for new fossil fuel power stations. However, high penetration PV, can lead to voltage instability due to intermittencies related to cloud cover. The output of PV is also generally noncoincident to utility system load peaks. If PV power is injected into a power system directly on a large scale, the PV power may produce issues related to dispatchability, reliability and stability. It may be desirable to filter out the highest rate transitions, and also avoid significant lag with respect to current power production.

Computer models of local utility grids were first developed to further understand integration of the batteries and PV. The results of actual field operation, combined with the underlying models are presenting a clear path in terms of optimizing battery size, and control algorithms, as well as offering a benchmark for measuring the benefits of battery storage.

Intermittent renewables present a challenge to utility system operations. Renewable Portfolio Standards mandate levels of renewable resources, and associated variations in power production that were not contemplated in traditional system designs. Distribution systems are designed to deliver power from the transmission system to utility customers. The design intent of distribution systems is to keep voltage and frequency levels within standard limits at all times for the utility customers. However, these systems have traditionally been designed for one-way power flow and are now being affected by large placements of PV. PV is appearing on the distribution grids, more so than on the transmission grids, due to modularity, associated costs of integrating large systems as well as tax incentives favoring customer and smaller utility owned sites. Various storage solutions are becoming a much needed component in recent Smart Grid demonstration projects. There is currently a need for an energy storage system that both can smooth and shift PV resources and thus lessen the effects of intermittency of PV and its effects on distribution systems.

SUMMARY

An embodiment of the present invention is a method for delivering energy using a renewable resource. The method applies energy storage to a photovoltaic energy source via a battery storage unit. The energy output from the photovoltaic energy source and the battery storage unit is controlled by a battery energy storage and control system, also referred to herein as a "battery control system". The battery control system predicts peak load, develops a schedule that includes when to begin discharging energy and when to stop discharging energy, shifts produced energy to optimize efficiency of the energy output, prioritizes functionality of the battery storage unit and the photovoltaic energy source, and delivers energy to a grid in a predictable manner. The method can also absorb wind power when the wind power is in excess of the capacity of the grid. When the battery control system prioritizes functionality, it can utilize peak shaving if a feeder peak output is greater than a user defined power output set-point or it can utilize firming during a predetermined time period. The battery control system can also discharge power if a real time price for energy is greater than a user-defined threshold. The method can further instruct the battery control system to dispatch energy to support reduction of feeder load, when feeder load is above a pre-determined threshold. This method can also preferably simultaneously smooth and shift power output from the photovoltaic energy source. The battery control system can provide additional power to the grid if an actual feeder peak value exceeds a pre-defined value. The method further includes retrieving a real-time price of energy, and storing energy from the photovoltaic energy source if a market day-ahead predicted price is less than a predefined value.

Another embodiment is an apparatus for delivering energy using a renewable resource. The apparatus includes a photovoltaic energy source, a battery storage unit for applying energy storage to the photovoltaic energy source, the battery storage unit coupled to the photovoltaic energy source, and a battery control system coupled to the battery storage unit. The battery control system controls energy output from the photovoltaic energy source and the battery storage unit, predicts peak load, develops a discharge schedule that includes when to begin discharging power and when to stop discharging power, shifts produced energy to optimize efficiency of the energy output, prioritizes functionality of the battery storage unit and the photovoltaic energy source, and delivers energy to a grid in a predictable manner. The battery storage unit includes a shifting battery and a smoothing battery. The shifting battery and the smoothing battery are simultaneously controlled by the battery control system. The battery storage unit also includes a converter and an inverter. The photovoltaic energy source also has an inverter. The apparatus can also include a wind energy source. When the battery control system prioritizes functionality, it can utilize peak shaving, reduce feeder load when the feeder load is above a pre-determined threshold, utilize firming, and utilize arbitrage.

DETAILED DESCRIPTION OF THE DRAWINGS

DETAILED DESCRIPTION

As used herein, "arbitrage" means storing energy when the energy is less expensive and discharging or selling energy when the energy is more expensive.

As used herein, "peak shaving" means to reduce power consumption during periods of maximum demand.

As used herein, "firming" means collecting power from PV during peak sun and then using the power from the PV when demanded. In other words, collecting PV power during peak sun, storing the collected PV power and then using the PV power at a later time, for example, during the evening or on a cloudy day when the sun is not shining.

As used herein, "peak load" means the time during a day, a week, a month or a year when a system reaches a peak or maximum power output.

As used herein, "discharging" means to release energy or power from a battery, capacitor, combinations thereof or the like.

As used herein, "converter" means a device that includes an inverter and rectifier, and which may thereby convert a DC voltage to a different DC voltage. An "inverter" converts current from DC to AC, and a "bidirectional inverter" converts current between DC and AC, in either direction. A "rectifier" converts current from AC to DC.

Embodiments of the present invention include an integrated PV and battery storage and control system that provides reliable energy using PV resources while providing multiple functions. These functions can include but are not limited to, emergency peak shaving, high value arbitrage, arbitrage (forecasted), peak shaving, firming, weekday daytime charging, weekday night charging due to weather, weekday night charging due to price and/or weekend charging. In this embodiment, the integrated system makes a load prediction, preferably a prediction for the next day, that combines several linear regression models formulated by a linear relationship between highest daily loads and temperatures. Based on the daily peak load prediction, the system creates a day ahead schedule that includes when to start discharging power, and when to stop discharging power. If peak shaving is not necessary for a predetermined day, the battery control system looks for arbitrage opportunities to store power during periods of low cost, and deliver it back to the market during the peak load time. If both peak shaving and arbitrage are not applicable, the battery control system firms PV production for peak usage times.

One embodiment of the present invention and a prospective solution to intermittency related to cloud cover is battery energy storage, designed and controlled to simultaneously smooth and shift PV output. In this embodiment, advanced lead acid batteries are used to shape a variable output of a PV resource to beneficially impact a utility grid.

The present invention includes a system and method for distributing energy using a renewable resource. The system and method includes providing a photovoltaic energy source, and applying energy storage to the photovoltaic energy source via a battery storage unit. The system and method can also include a wind energy source, as noted herein. This system and method also controls the energy output from the combined photovoltaic/battery system via a battery control system. The battery control system reduces feeder load when load is above a defined threshold. Energy is then delivered in a predictable manner and economic benefit is maximized by delivering power when it is most valuable to the system. The value is based on price, feeder load, weather, using day-ahead optimization in combination with model-predictive control. The method can also assist with absorbing wind power when the wind power is in excess of the grid's capacity to absorb it.

In one embodiment of the present invention, one or more storage systems are coupled with the implementation of renewable energy systems. These one or more storage systems can smooth output and perform energy firming as well as price arbitrage and peak shaving. Two applications that can be used with the one or more storage systems are smoothing and shifting. Smoothing is power based and relates to the storage system removing intermittency of PV output. Shifting is energy based and includes firming PV as well as price arbitrage and peak shaving. In this embodiment, two types of advanced lead acid batteries are used, one for shifting energy and the other for smoothing the power.

Energy Storage Systems

Figure 1:
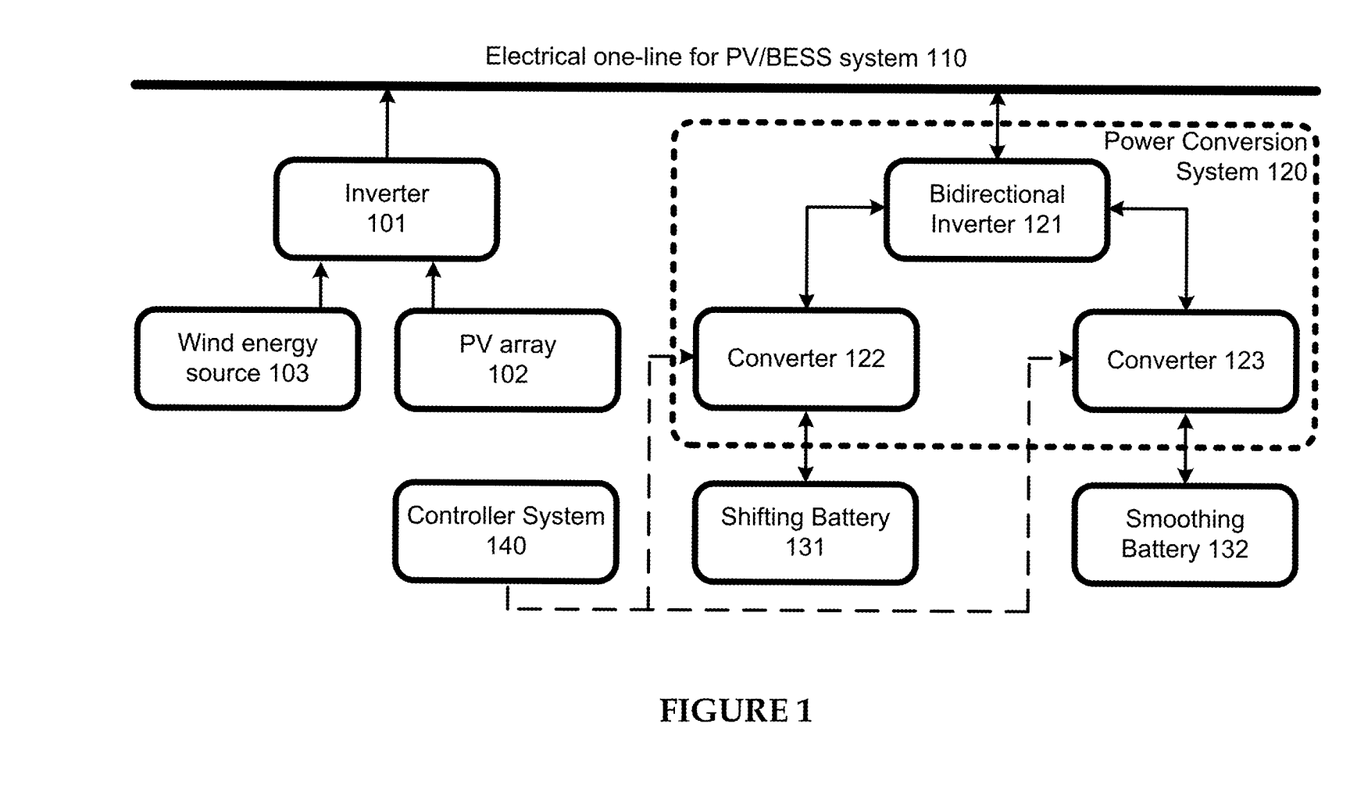
FIG. 1 is a schematic representation of a PV array coupled to a battery storage unit and battery control system of one embodiment of the present invention.

With reference to FIG. 1, and as stated above, an energy storage system may include a PV array 102 and a battery energy storage and control system (BESS). The BESS is preferably composed of 3 parts: the battery system including batteries 131 and 132, power conversion system (PCS) 120 and a controller system 140. FIG. 1 shows a schematic of this system. The BESS includes a shifting battery 131 coupled to a converter 122 and a smoothing battery 132 coupled to a separate converter 123. The converters 122 and 123 are then coupled to a bidirectional inverter 121 which is coupled to an electrical line 110. The electrical line 110 is coupled to a second inverter 101 that is coupled to PV array 102. A wind energy source 103 may also be used, as noted herein.

In one embodiment, the PV array 102 produces about 500 kW as its peak power output. Irradiance sensors, preferably about five irradiance sensors, collect solar flux information in different positions of the PV array 102. In one example, there are five irradiance sensors located in four corners and the center of the PV array 102. The irradiance measurements can be used to correlate with the weather patterns and/or to provide real-time data for smoothing algorithms.

To smooth intermittencies in the output of solar power, the batteries in the BESS are charged and discharged via PCS 120 at high rates. A Standard Valve Regulated Lead-Acid (VRLA) battery typically cannot meet the high rates of charge and discharge. Two technologies can address this problem. The first technology is an UltraBattery, which is a VRLA battery with embedded ultra-capacitor features for rapid discharge applications. The UltraBattery can be deployed with PV power plants to smooth variable power generation that is disrupted by clouds. The UltraBattery can also respond fast enough to compensate the rapid changes of PV. The second technology used is an Advanced Carbon and/or Lead Batteries, which are VRLA batteries exhibiting significantly longer cycle-life than standard VRLA technology and are used in a shifting application, as opposed to smoothing. The combination of these two battery technologies enables long-life VRLA batteries to be deployed with PV power plants to both smooth power generation that is interrupted by variable clouds, and shift power delivery at times of high power demand.

In one embodiment, power conditioning system (PCS) 120 includes two converters 122 and 123 and one bidirectional inverter 121. The two converters 122 and 123 are separately coupled to shifting battery 131 and smoothing battery 132 systems in order to convert the DC of a battery into a DC voltage of 600 Volts, and vice versa as denoted by the two-way arrows in FIG. 1. Then the two converters 122 and 123 are both coupled to bidirectional inverter 121 which inverts DC into AC, and vice versa as denoted by the two-way arrow in FIG. 1. The PCS 120 collects and logs data, such as DC voltage, DC current of the two batteries 131 and 132, and AC current, voltage of inverted battery output power.

A controller system 140 supplies the active and reactive power references for the battery systems 131 and 132. The controller system 140 also collects information of the shifting battery 131 and smoothing battery 132 systems, and sends a control signal to the PCS 120. The controller system 140 obtains information from the PCS 120. The information includes power output and status of charging for both the shifting battery 131 and smoothing battery 132 systems. The power reference derived goes to the PCS 120. The converters 122 and 123 of PCS 120 then use the active power reference to regulate the power output of batteries 131 and 132.

Ramping rate is the rate of change in an instantaneous output from a battery. A maximum ramping rate is established to prevent undesirable damage due to rapid changes in charging or discharge of a battery.

Figure 2:
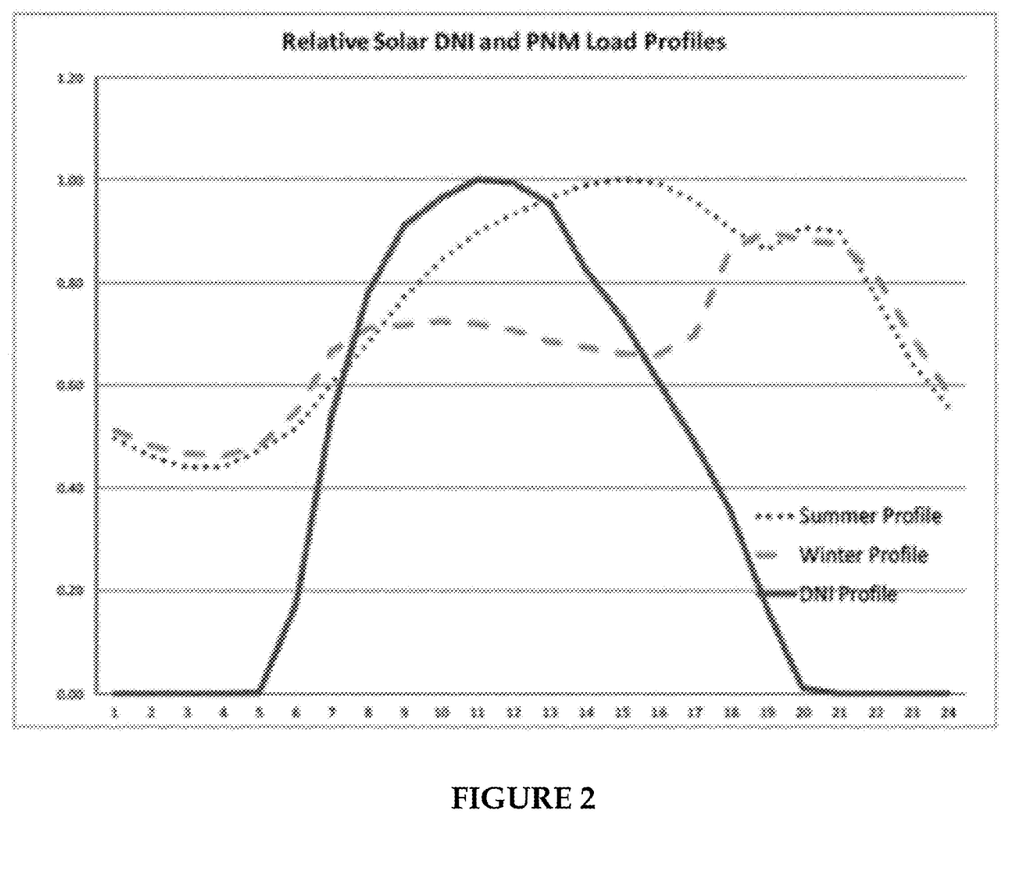
FIG. 2 is a chart showing alignment of solar peak to system peak.

Another factor that utilities deal with in terms of renewables is misalignment of renewable peak production to system load peaks. While there may be better alignment of PV to utility summer peaks (compared to wind), these PV peaks typically occur about two hours or more prior to system peaks in the summer due to thermal lag in the consumer facilities, as shown in FIG. 2. There may also be even less alignment of PV peaks to winter and shoulder peak loads.

In order to position for current and future growth of PV, embodiments of the present invention use energy storage systems to address intermittency needs and make renewable resources more valuable.

EXAMPLE

The following is a non-limiting example.

In one example, a 500 kW PV resource with an associated utility scale battery was built and tested. The system of this example employed a high resolution data control and acquisition system that provided data analysis.

In this example, there was also a 15% reduction of peak capacity on the feeder, creation of a firm, dispatchable renewable resource as well as industry translatable models of high penetration PV feeders with storage. Modeling was conducted in two platforms, OpenDSS from EPRI and GridLAB-0. The power distribution system simultaneously performed PV smoothing and shifting.

A shifting battery system was also operated in this example at a SoC less than 100% of charge, and was operated within upper and lower limits set by a BESS controller. The difference between the upper and lower limits is the "usable energy". The usable energy can be used for shifting applications.

Load shifting identifies a combination of start/stop times for both charging and discharging the shifting battery, and identifies preferable charge/discharge rates for a given feeder configuration. Because of the high cost of battery storage, it is preferable to use the battery only at a time when it is most needed.

Figure 3:
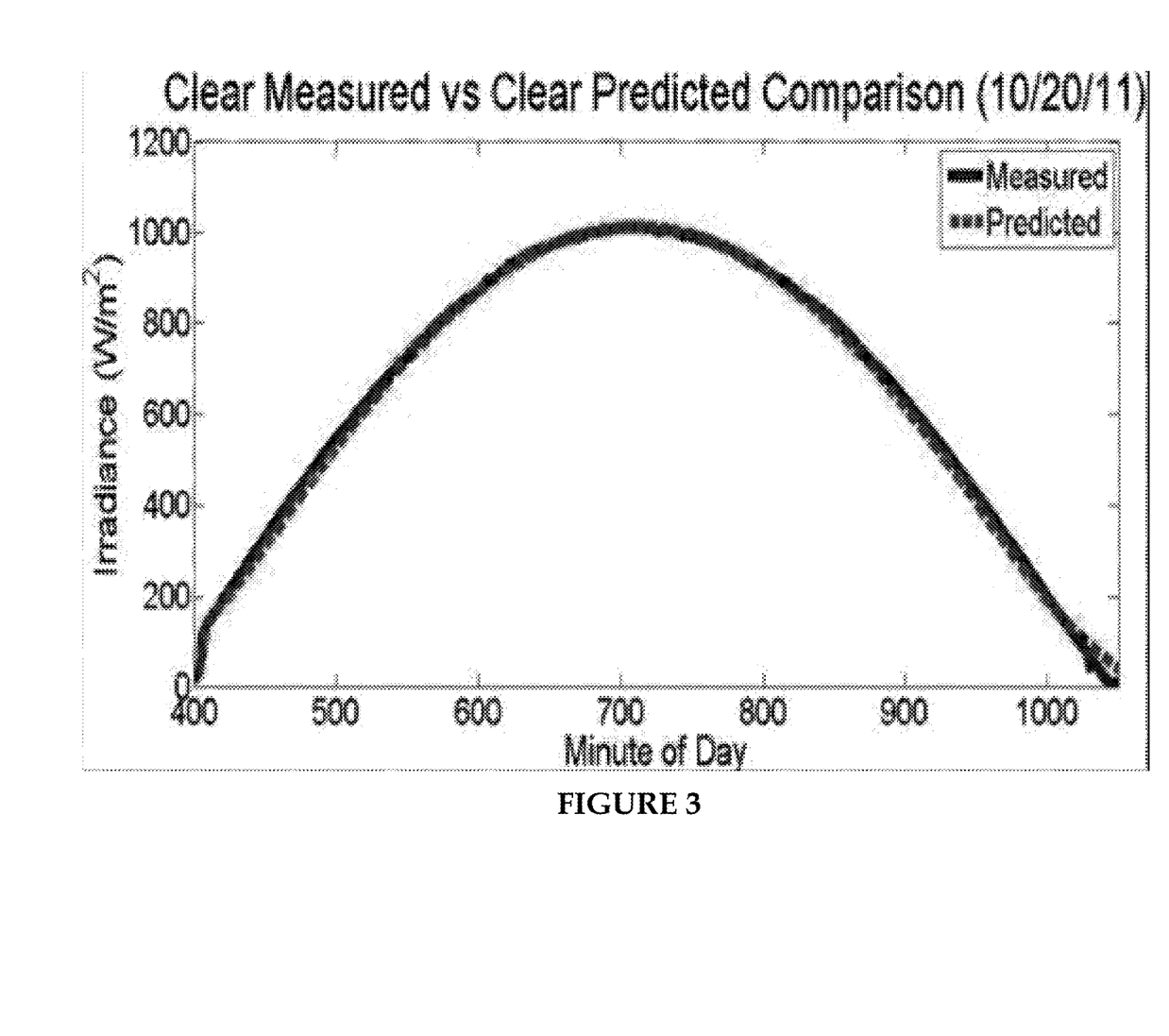
FIG. 3 is a chart showing alignment of predicted and actual clear day power.
Figure 4:
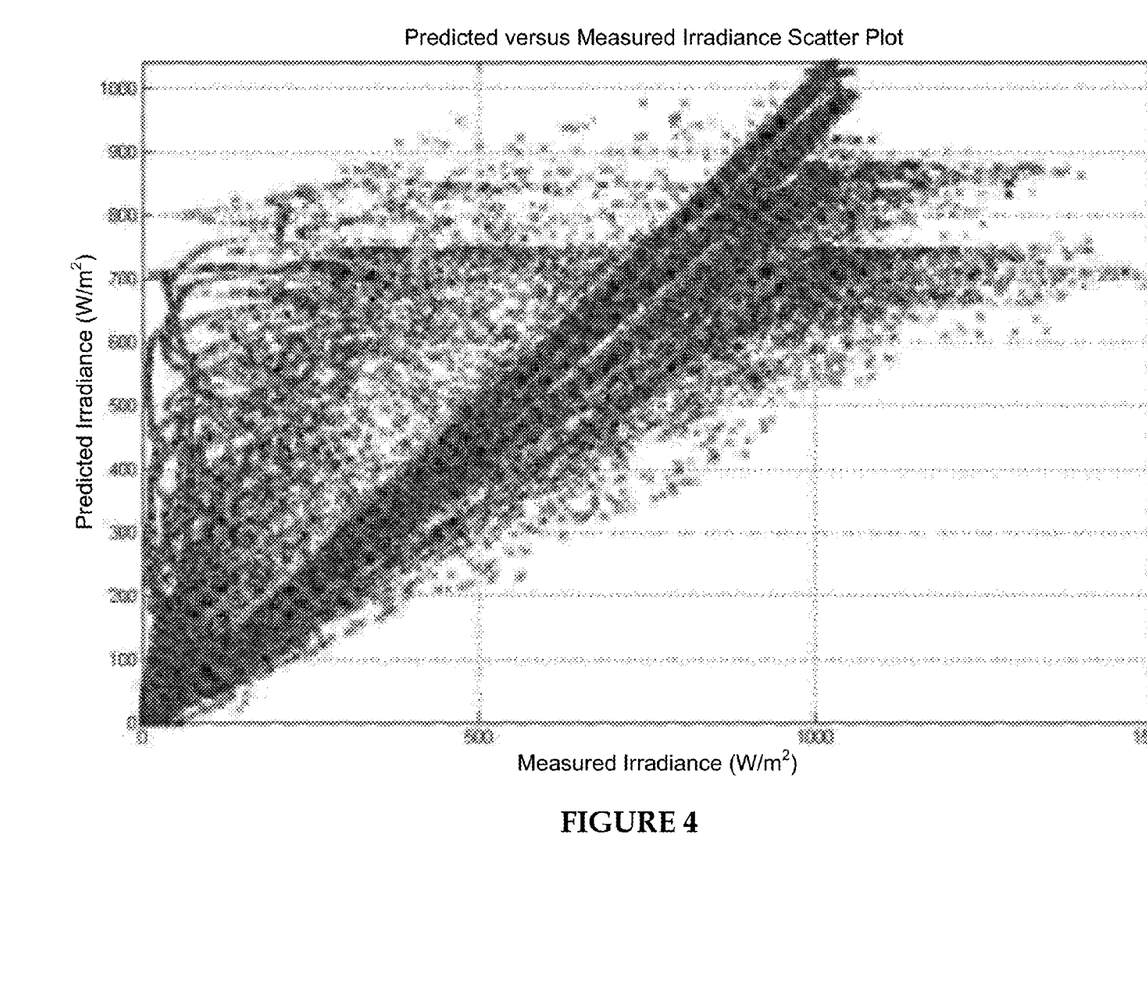
FIG. 4 is a chart showing a correlation of a cloudy day prediction to actual cloudy day power.

A shifting algorithm predicts PV production for the next day and prioritizes when and how much energy is stored and when and how much energy is delivered. This strategy has the flexibility to change from summer to shoulder to winter operation when different peak times occur and in winter when dual daily peaks occur. The algorithm uses a power prediction engine that uses next day percent cloud cover predictions. This prediction engine is tuned through correlation analysis of historic forecast and actual site irradiation and PV power production data. Results from the example showed that for a clear day the prediction engine correlates with the predicted curve matching production, FIG. 3. For cloudy days, the correlation was not strong as shown in the R-squared analysis with the predicted percent cloud cover consistently overestimating cloud cover, see FIG. 4.

Figure 5:
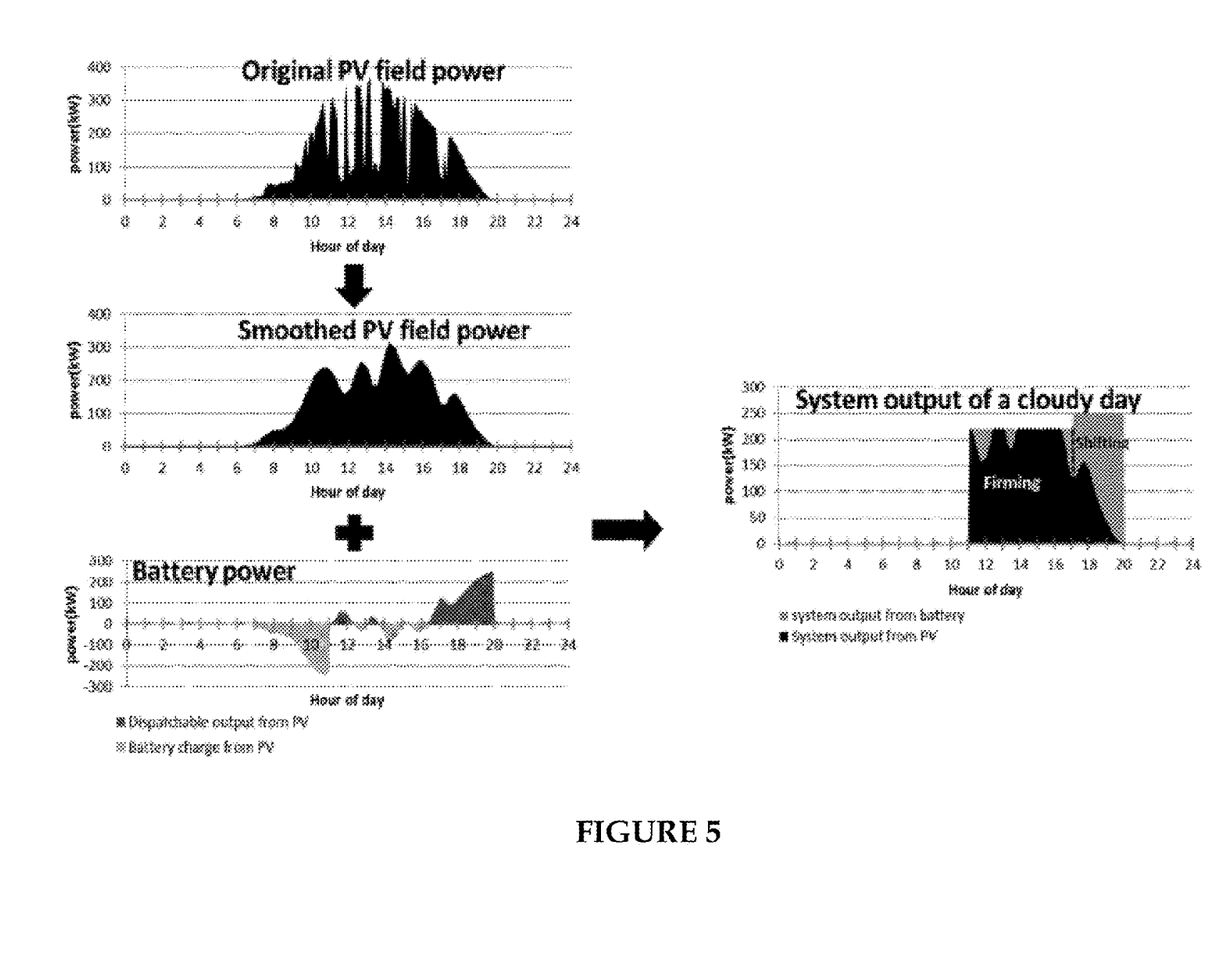
FIG. 5 is an illustration of charts showing predicted output of smoothing and shifting.

The prediction engine can generate, based on next day predictions, operating levels of shifting battery charge and discharge for successive time intervals throughout the day. FIG. 5 shows an example of a predicted output curve of a PV and battery combination and battery output.

The shifting algorithm may include price forecasts, overall system and distribution load forecasts. The shifting algorithm can also be tuned to peak shaving where distributions system based signals (as opposed to system based signals used for firming) are used to target a 15% reduction of load on the feeder.

In this example, a 500 kW PV field of standard crystalline-silicon panels and an inverter along with a complete battery system was used. The shifting battery system included multiple shipping containers, one or more (e.g., two) Ultrabatteries® dedicated to smoothing PV output and one or more (e.g., six) advanced Lead Acid batteries dedicated to shifting. A robust data acquisition system collected about one second data for 208 points in the system, including metrology, PV string parameters, battery points and utility grade metering, including phasor measurement units.

The data gathering was centered on testing individual functionality and then combined all functionality in the final test plan. The tests included:

Smoothing

Firming (shifting to a system based signal)

Peak Shaving (shifting to a feeder/substation based signal)

Arbitrage

All the above combined

In this example, the shifting algorithm was implemented in a basic form. As mentioned, this algorithm takes a percent cloud cover forward forecast from the National Weather Service and runs a predictive power analysis which is then used to predict the required shifting battery schedule. This analysis was embedded in an Advanced Calculation Engine (ACE) integrated with the data historian serving the project. Calculated charge and discharge values from the ACE system and an associated schedule were sent to the battery system controller. Initial results of shifting are shown in the following FIG. 6.

The results from this example show alignment with the predictive model considering that the schedule was manually input in about fifteen (15) minute increments and was tuned to much finer granularity in an automated system.

Alignment of the models for shifting was tested to ascertain the accuracy of the system and battery model output as well as SoC calculations by comparing these to actual measurements in the field during smoothing and shifting operation.

Figure 6:
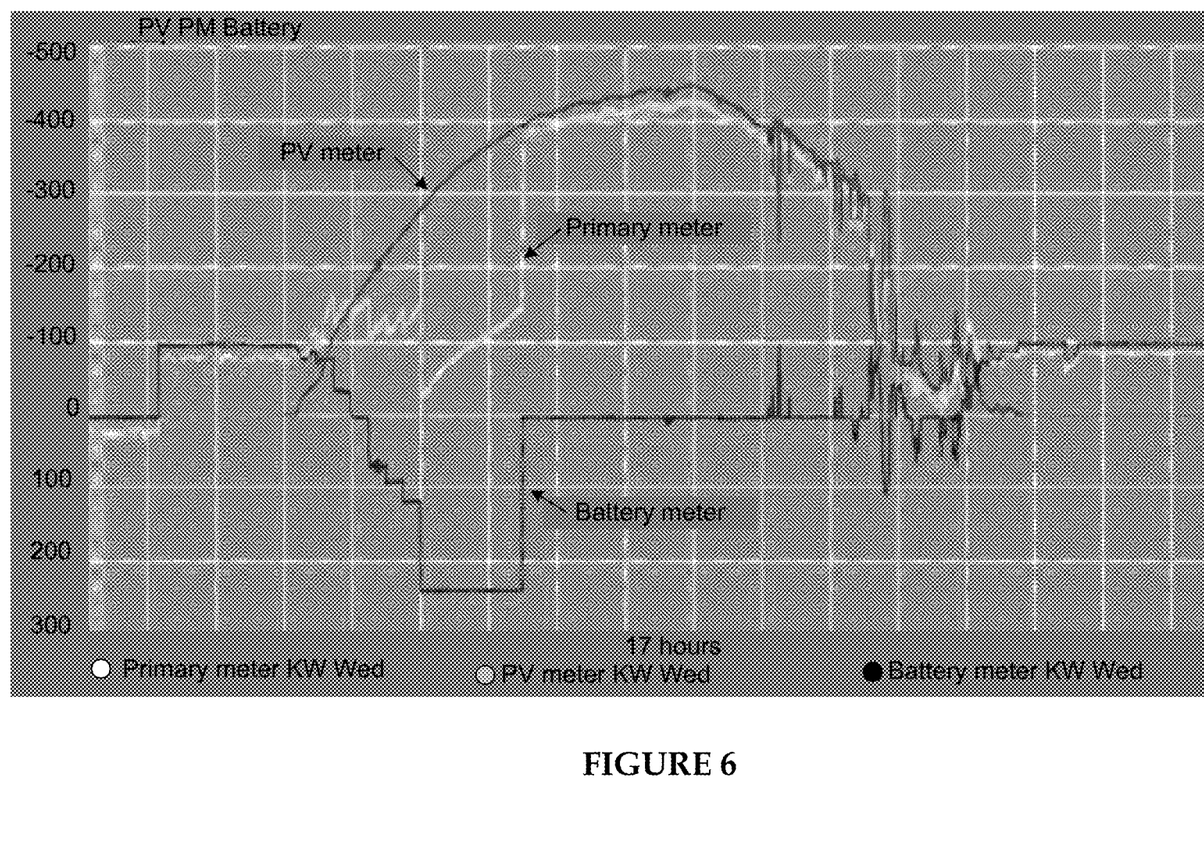
FIG. 6 is a graph showing an initial demonstration of a shifting algorithm.

Simultaneous shifting and smoothing involves automated implementation of a shifting algorithm while allowing the smoothing algorithm to run simultaneously. A magnified view of FIG. 6 is presented in FIG. 7 where the simultaneous shifting and smoothing occur.

Figure 7:
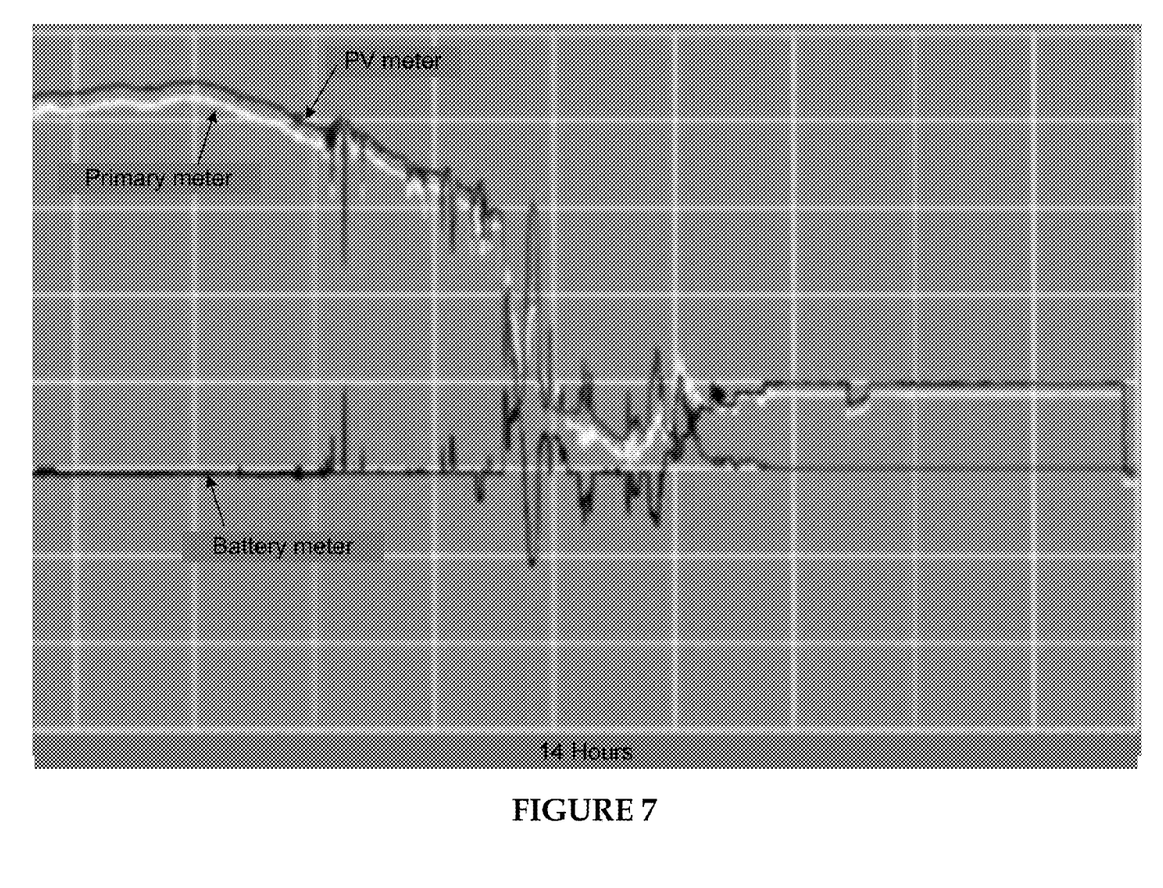
FIG. 7 is a graph showing a magnified portion of the example in FIG. 6.

As can be seen in FIG. 7, as the PV power generation declined in the evening, cloud cover introduced intermittency while at the same time the shifting batteries started discharging to meet an evening peak. At this point both shifting and smoothing batteries were working simultaneously.

Figure 8:
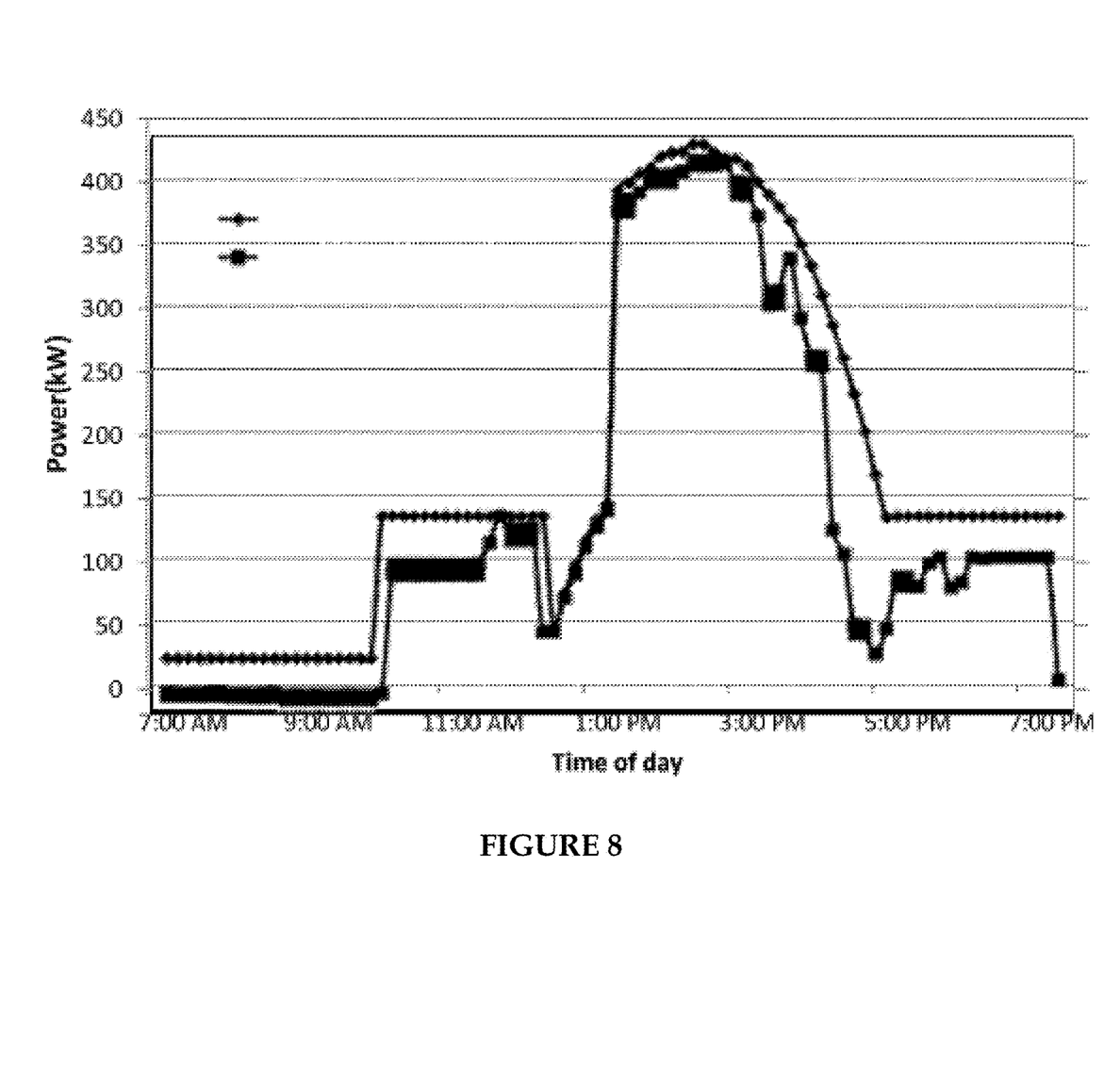
FIG. 8 is a graph showing a comparison between a predicted versus actual results of shifting.
Figure 9:
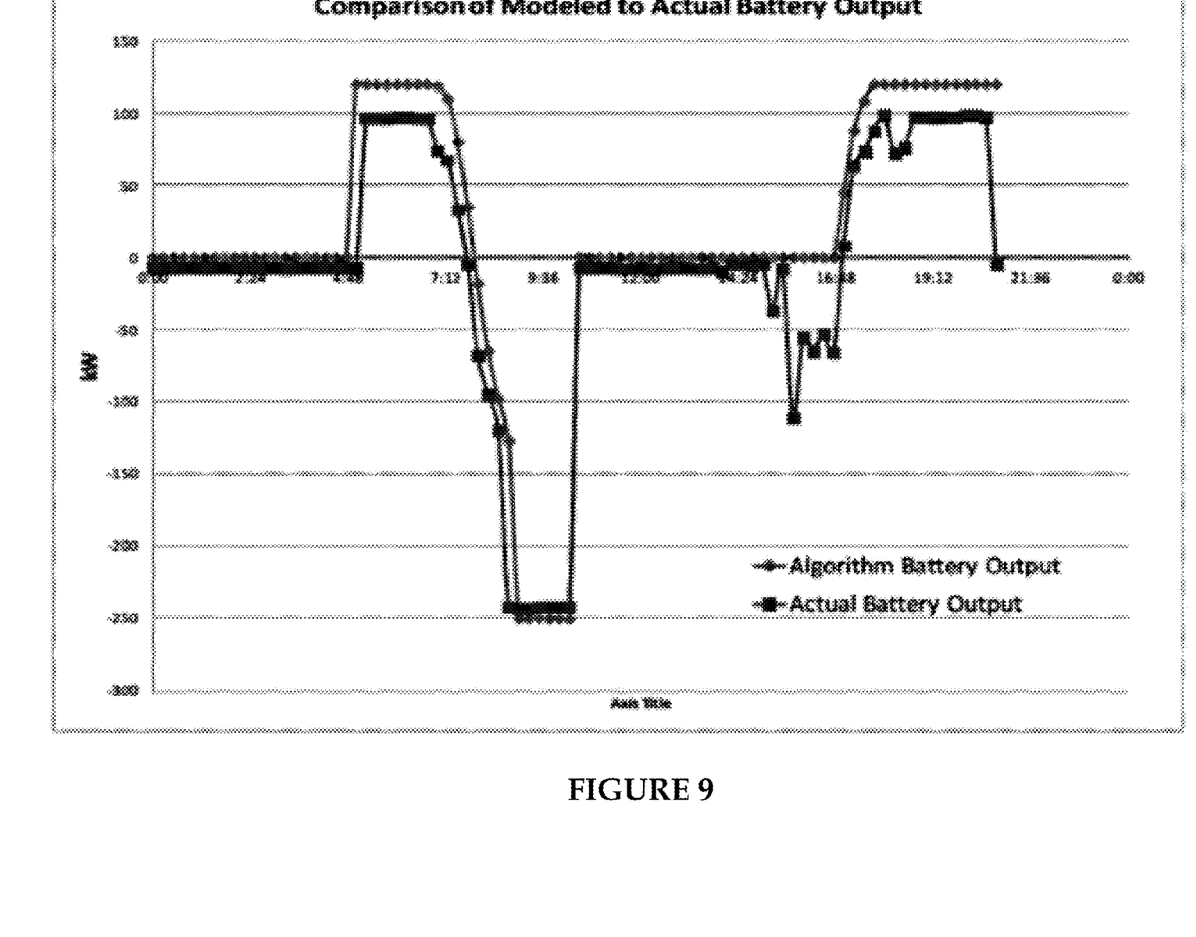
FIG. 9 is a graph showing a comparison of predicted to actual battery output.

FIG. 8 compares the modeled system output to actual output. The model results were well tuned until deviation from cloud cover occurred in the late afternoon. Similarly the system output for the modeled battery compared well to field data, shown in FIG. 9.

Figure 10:
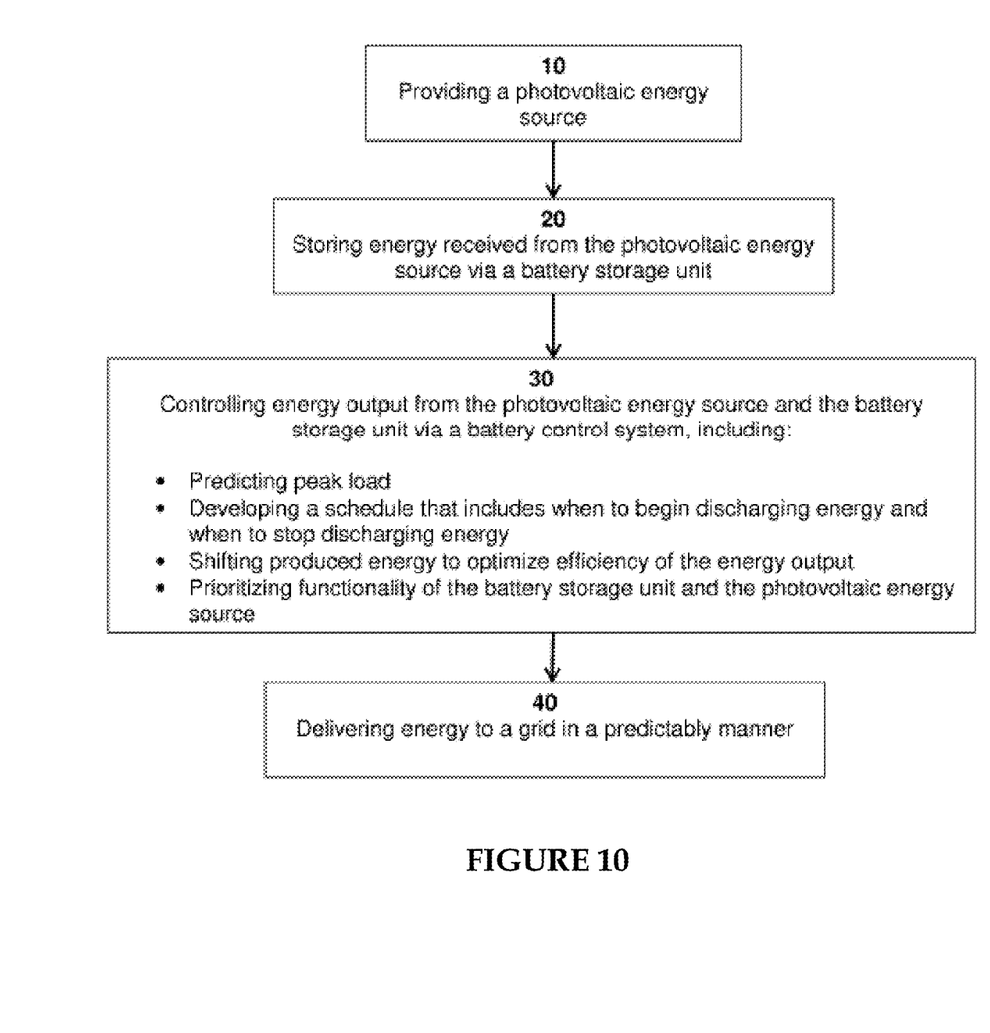
FIG. 10 is a flow diagram of a method of the present invention.

FIG. 10 is a flow diagram of an embodiment of the present invention. In step 10, a photovoltaic energy sources is provided. In step 20, energy from the photovoltaic energy sources is stored in a battery storage unit. In step 30, energy output from the photovoltaic energy source is controlled using a battery control system. The battery control system controls the energy output by predicting peak load, developing a schedule that includes when to begin discharging energy and when to stop discharging energy, shifting produced energy to optimize efficiency of the energy output, and prioritizing the functionality of the battery storage unit and the photovoltaic energy source in order to deliver energy to a grid in a predictably manner as shown in step 40.

Figure 11:
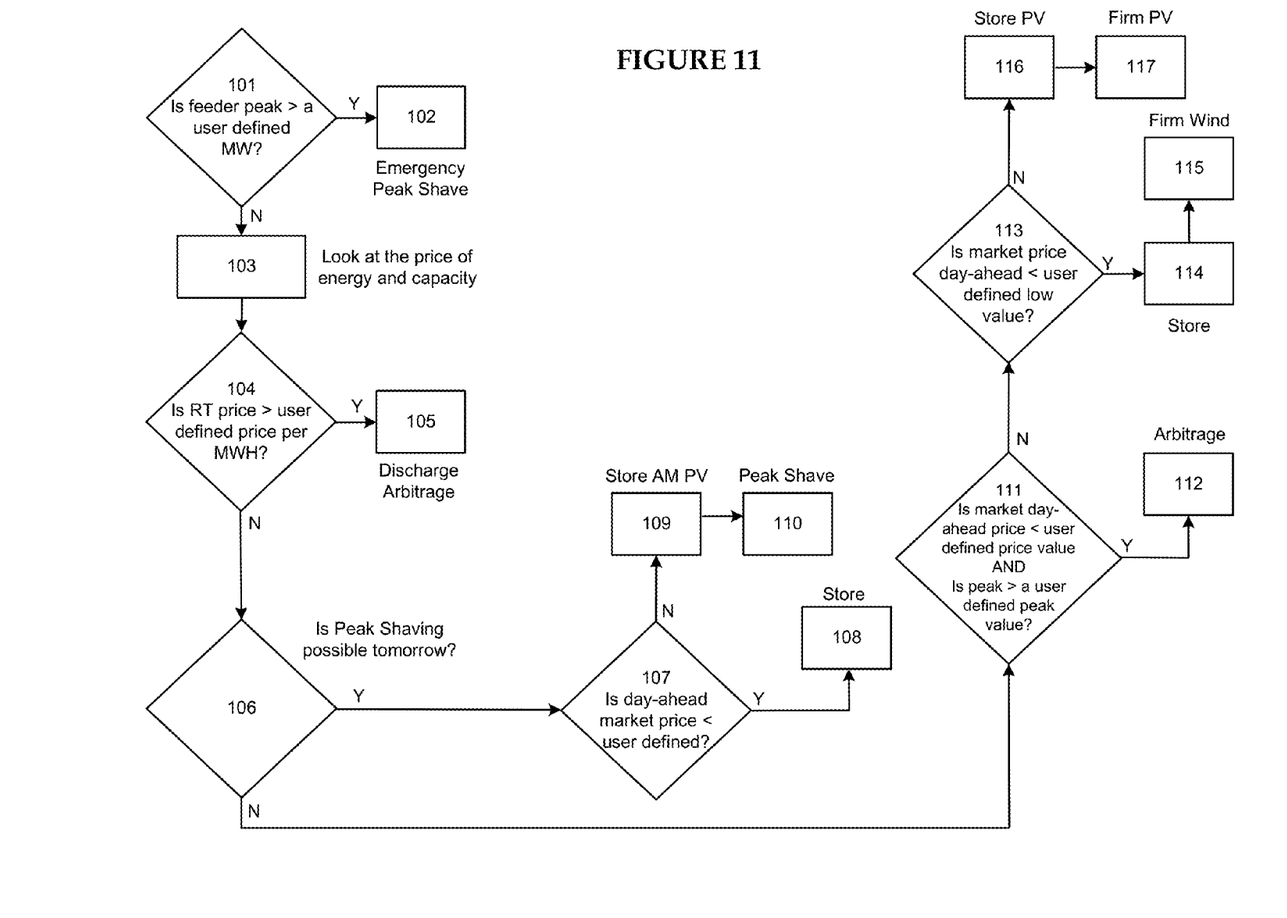
FIG. 11 is a schematic showing a shifting logic flow of an embodiment of the present invention.

A shifting logic flow diagram of an embodiment of the present invention is illustrated in FIG. 11. In step 101 of FIG. 11, a battery control system determines if the feeder peak of a utility grid is greater than a user defined power or energy output (preferably in megawatts).

In other words, the battery control system detects when a feeder peak value is greater than a predefined user configured value. The predefined user configured value is preferably based on a rating of local infrastructure (e.g., equipment ratings for transformers, switches, wire, cable, combinations thereof or the like).

In step 102, emergency peak shave, if the actual feeder peak value exceeds the predefined user configured value, the battery control system provides power to the utility grid to relieve loading on upstream infrastructure to the extent the utility grid allows.

In step 103, if step 101 is no, the battery control system retrieves a real time price of energy from pre-defined utility marketing information from within a utility data system If the battery control system does not need to provide additional power to ensure reliability of the utility grid, the battery control system detects if energy prices are greater than some predefined user defined price.

In step 104, the battery control system determines if the real time (RT) price is greater than a user defined price (for example in dollars per megawatt hour, wherein megawatt hour is denoted as MWH). The battery control system then stores energy prices as defined by a user. These energy prices can be local prices in real time pricing and/or a time of use pricing rate structure or can be regional prices based on cost within an independent system operator (ISO), a regional transmission operator (RTO) or a utility balancing area.

In step 105, discharge arbitrage, if the current RT price exceeds a user defined threshold, the battery control system dispatches energy from the battery either at the current RT price or allows other generated power to be sold at the current RT price.

In step 106, the battery control system determines if peak shaving is possible the next day at a greater rate than a user defined power output. The battery control system also determines if a predicted temperature for the next day is greater than a user defined temperature. The predicted temperature is retrieved from a National Oceanic and Atmospheric Administration forecast. Absent any real time dispatch to support feeder peak shaving or opportunity for RT pricing, the battery control system makes a prediction on how to react if peak shaving is needed and/or there is a predicted high price for the next day. These predictions take into account user defined thresholds for feeder loading for which peak shaving is optimal, as well as user defined temperature thresholds which can trigger a higher feeder load condition.

In step 107, the battery control system determines a day-ahead market price between 2:00 am and 6:00 am and whether the day-ahead market price is less than a user defined price. If the battery control system does not predict a need for feeder peak shaving a day ahead, the battery control system then determines if there is an opportunity to store inexpensive power during off peak times to sell during times of more expensive energy prices. The battery control system also analyzes available day-ahead pricing in the local ISO, RTO, or balancing area and makes decisions on when to store energy or dispatch energy based on user defined thresholds.

In step 108, the battery control system stores electricity in the battery in the low cost early morning hours, preferably between about 2:00 am and 6:00 am.

In step 109, if price thresholds are not met on a day-ahead basis, the battery control system stores energy during the morning hours when PV production is increasing, but when system loads are typically low.

In step 110, peak shave or firm PV, the stored energy in the early morning hours is dispatched based on the season and based on user defined dispatch levels. For example, it may be optimal during summer months to dispatch energy late in the afternoon to support cooling load, while during winter months, it may be optimal to dispatch in the early evening hours.

In step 111, the battery control system determines if the market day-ahead price is less than a user defined price, and if peak discharge is greater than a peak value defined by the user. If the battery control system detects an opportunity to both buy lower cost electricity in the overnight lower price hours and also predicts high pricing during peak times the next day, the battery control system performs an arbitrage function.

In step 112, the battery control system dispatches for arbitrage.

In step 113, the battery control system determines if the predicted market price day-ahead for energy is less than a user defined price. If the market price is a lower value at night, but there is no predicted high prices the next day, a condition in many cases that is caused by an overabundance of overnight wind power, then the battery control system charges during night (e.g., 2:00 am to 6:00 am). Then, with high wind output, the wind power can be dispatched as firm power the next day at a time of day that is defined based on the season and a time of day that is defined by a user.

In step 114, energy is stored during the night, preferably between about 2:00 am and 6:00 am based on the pricing in step 113.

In step 115, firm wind power is dispatched in amounts that are based on the season and during a user defined time of day in step 113.

In step 116, absent any needs for peak shaving, opportunities for arbitrage, or firming other renewables, the battery control system charges in the early morning hours typically when loads are low and PV output is increasing.

In step 117, energy is dispatched based on the season and the user defined time of day in step 116.

At any time that the battery discharges or charges, the discharge/charge rates are controlled using a model-predictive-control (receding horizon) algorithm, the model-predictive-control algorithm uses estimates of the PV power production based on weather forecast and estimates of load based on learning algorithms.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for using a battery energy storage and control system to deliver energy from a renewable resource to a grid, comprising:

receiving Alternating Current (AC) energy from the renewable resource at the battery energy storage and control system;

converting, by a power conversion system within the battery energy storage and control system, the received AC energy to received Direct Current (DC) energy;

charging a shifting battery with the received DC energy, via a first converter within the power conversion system, wherein a controller system coupled to the power conversion system controls charging the shifting battery according to a schedule;

charging a smoothing battery with the received DC energy, via a second converter within the power conversion system, wherein the controller system controls charging the smoothing battery in order to remove intermittency of renewable resource output;

controlling, by the controller system, energy output from the renewable resource and the shifting and smoothing batteries in order to deliver energy to the grid in a predictable manner, the controlling energy output step comprising:

developing a discharge schedule that includes when to begin discharging energy from the shifting and smoothing batteries to the grid, and when to stop discharging energy from the shifting and smoothing batteries to the grid;

discharging the shifting battery via the first converter, according to the discharge schedule; and discharging the smoothing battery via the second converter, according to the discharge schedule;

wherein the power conversion system converts DC energy outputs from the shifting and smoothing batteries into an AC energy output supplied to the grid.

2. The method of claim 1, wherein the renewable resource comprises one or more of a photovoltaic (PV) array or a wind energy source.

3. The method of claim 1, wherein controlling, by the controller system, the energy output comprises discharging the shifting and smoothing batteries to perform emergency peak shaving if a feeder peak value of the grid exceeds a defined value.

4. The method of claim 1 wherein the discharge schedule comprises a day ahead schedule based on a daily peak load prediction.

5. The method of claim 1 wherein controlling, by the controller system, the energy output comprises discharging the shifting and smoothing batteries to perform arbitrage by discharging energy if a real-time price for energy is greater than a user-defined threshold.

6. The method of claim 1, wherein controlling, by the controller system, the energy output comprises simultaneously controlling discharge of the smoothing battery and the shifting battery.

7. The method of claim 1, wherein controlling, by the controller system, the energy output comprises determining if peak shaving is possible on a next day at a greater rate than a user defined power output, in order to determine a day ahead discharge schedule.

8. The method of claim 1, wherein controlling, by the controller system, the energy output comprises adapting the discharge schedule to store energy from the renewable resource if a market day-ahead predicted price is less than a predefined value.

9. A battery energy storage and control system adapted to deliver energy from a renewable resource to a grid, comprising:

a battery storage unit comprising a shifting battery and a smoothing battery;

a controller system; and a power conversion system adapted to store and discharge energy from the renewable resource in response to instructions from the controller system, the power conversion system comprising:
- a bidirectional inverter to convert Alternating Current (AC) energy received from the renewable resource to Direct Current (DC) energy for storage in the battery storage unit, and vice versa;
- a first converter coupled between the bidirectional inverter and a shifting battery in a battery storage unit; and
- a second converter coupled between the bidirectional inverter and a smoothing battery in the battery storage unit;

wherein the controller system controls energy output from the renewable resource and discharge of the battery storage unit via the power conversion system according to a schedule that includes when to begin discharging energy and when to stop discharging energy; and wherein the controller system controls discharge of the battery storage unit at least in part by supplying power references for the shifting battery and the smoothing battery to the power conversion system, and wherein the first and second converters use the power references to regulate power output of the shifting battery and the smoothing battery.

10. The apparatus of claim 9, wherein the shifting battery and the smoothing battery are simultaneously controlled by the controller system.

11. The apparatus of claim 9, wherein the renewable resource comprises a wherein the photovoltaic energy source or a wind energy source coupled to an inverter.

12. The apparatus of claim 9, wherein the controller system is adapted to discharge the shifting and smoothing batteries to perform emergency peak shaving if a feeder peak value of the grid exceeds a defined value.

13. The apparatus of claim 9, wherein the schedule that includes when to begin discharging energy and when to stop discharging energy comprises a day ahead schedule based on a daily peak load prediction.

14. The apparatus of claim 9, wherein the controller system is adapted to perform arbitrage by discharging the shifting and smoothing batteries during a predetermined time period.

15. The apparatus of claim 9, wherein at least one of the shifting battery or the smoothing battery comprises a Valve Regulated Lead-Acid (VRLA) battery with an embedded ultra-capacitor for rapid discharge applications.

16. The apparatus of claim 9, wherein the controller system controls discharge rates of the battery storage unit using a model-predictive-control algorithm.

* * * * *